United States Patent
Schumacher et al.

(10) Patent No.: US 6,754,907 B1
(45) Date of Patent: *Jun. 22, 2004

(54) REMOTE CONTROL OF VIDEO-ON-DEMAND SYSTEM

(75) Inventors: James Schumacher, Oakland, CA (US); Mike O'Brien, Pacifica, CA (US); Jay Cee Straley, San Carlos, CA (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/501,054

(22) Filed: Feb. 9, 2000

(51) Int. Cl.[7] .......................... H04N 7/173; H04N 8/16
(52) U.S. Cl. .............................. 725/87; 725/91; 725/93; 725/109; 725/110; 725/116; 725/118; 348/460; 348/552; 348/734
(58) Field of Search ................................ 725/141, 153, 725/110, 121, 122, 106, 108, 133, 58, 86–104, 1–8, 112, 113, 114, 116, 117, 118; 348/734, 460, 552

(56) References Cited

U.S. PATENT DOCUMENTS

| | | | | |
|---|---|---|---|---|
| 5,488,412 A | * | 1/1996 | Majeti et al. | 725/111 |
| 5,574,779 A | * | 11/1996 | Ely et al. | 379/221.09 |
| 5,594,490 A | * | 1/1997 | Dawson et al. | 725/67 |
| 5,761,602 A | * | 6/1998 | Wagner et al. | 725/34 |
| 5,928,327 A | * | 7/1999 | Wang et al. | 725/88 |
| 5,930,250 A | * | 7/1999 | Klok et al. | 370/352 |
| 5,969,714 A | * | 10/1999 | Butcher | 345/719 |
| 6,041,356 A | * | 3/2000 | Mohammed | 709/227 |
| 6,078,810 A | * | 6/2000 | Olds et al. | 455/428 |
| 6,105,060 A | * | 8/2000 | Rothblatt | 709/219 |
| 6,157,809 A | * | 12/2000 | Kambayashi | 725/91 |
| 6,191,806 B1 | * | 2/2001 | Mayer | 725/1 |
| 6,205,485 B1 | * | 3/2001 | Kikinis | 709/231 |
| 6,219,355 B1 | * | 4/2001 | Brodigan | 370/486 |
| 6,285,660 B1 | * | 9/2001 | Ronen | 370/259 |
| 6,314,573 B1 | * | 11/2001 | Gordon et al. | 725/61 |
| 6,392,664 B1 | * | 5/2002 | White et al. | 345/717 |
| 6,421,728 B1 | * | 7/2002 | Mohammed et al. | 709/227 |
| 6,430,603 B2 | * | 8/2002 | Hunter | 709/207 |
| 6,480,753 B1 | * | 11/2002 | Calder et al. | 700/83 |
| 6,484,318 B1 | * | 11/2002 | Shioda et al. | 725/110 |
| 6,542,500 B1 | * | 4/2003 | Gerszberg et al. | 370/354 |
| 6,577,414 B1 | * | 6/2003 | Feldman et al. | 725/129 |

* cited by examiner

*Primary Examiner*—John Miller
*Assistant Examiner*—Annan Q. Shang

(57) ABSTRACT

A video-on-demand system transfers video content signals to a first communication system. The video-on-demand system transfers a control screen signal to a second communication system and receives a video control signal from the second communication system. The video-on-demand system implements a viewer control selection indicated by the video control signal. The control screen could be a web page that includes a video display control menu comprising play stop, pause, rewind, and fast forward. The control screen could include a video content selection menu. The video-on-demand system implements the control screen menu selections.

25 Claims, 7 Drawing Sheets

REMOTE CONTROL OF VIDEO-ON-DEMAND SYSTEM

BACKGROUND OF THE INVENTION

1. Field of the Invention

The invention is related to the field of video systems, and in particular, to a video-on-demand system that provides a viewer with remote control.

2. Description of the Prior Art

Video-on-demand systems are currently being designed and implemented. The video-on-demand system offers an individual viewer various selections from a video content library for viewing on-demand. Some examples of video content include movies, television shows, documentaries, news, and sports. The video-on-demand system receives a request from the viewer to view a particular selection from the video content library. In response to the request, the video-on-demand system transfers the selected video content over a communication system to the viewer's display. Thus, the video-on-demand system allows a viewer to immediately view selected video content.

Video-on-demand systems use a television set-top box for remote control. Using the set-top box, the viewer may view a video content menu on the television and order video content for display on the television. The viewer may also view a video control menu on the television to play, stop, pause, rewind, and fast forward the video content on the television Unfortunately, the set-top box is a special component that is closely coupled to the television. The set-top box does not have other uses.

SUMMARY OF THE INVENTION

The invention solves the above problems with a video-on-demand system that allows the viewer to use a portable computer connected over second communications system for remote control. The second communications system could be the web, and the portable computer could run a web browser. Advantageously, the viewer can control the video display using their portable computer. The portable computer has many other uses and eliminates the cost of a special television set-top box.

The video-on-demand system transfers video content signals to a first communication system. The video-on-demand system transfers a control screen signal to a second communication system and receives a video control signal from the second communication system. The video-on-demand system implements a viewer control selection indicated by the video control signal. The control screen could be a web page that includes a video display control menu comprising play, stop, pause, rewind, and fast forward. The control screen could include a video content selection menu. The video-on-demand system implements the control screen menu selections.

BRIEF DESCRIPTION OF THE DRAWINGS

The same reference number represents the same element on all drawings.

DETAILED DESCRIPTION

Figure 1:
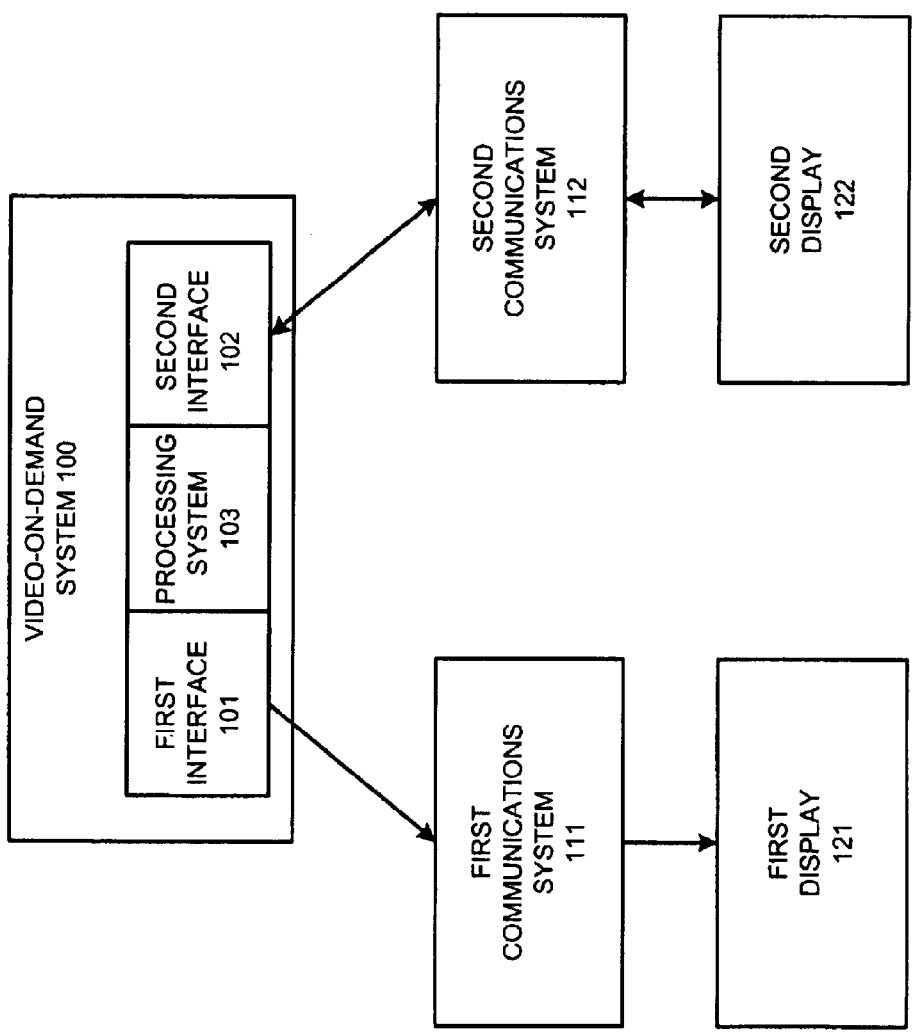
FIG. 1 is a block diagram that illustrates the configuration and operating environment for a video-on-demand system in an example of the invention.

System Configuration—FIG. 1

FIG. 1 is a block diagram that illustrates a video-on-demand system 100 and its operating environment in an example of the invention. The video-on-demand system 100 comprises a first communication interface 101 and a second communication interface 102 that are each coupled to a processing system 103. The first communication interface 101 is coupled to a first communication system 111. The first communication system 111 is coupled to a first display 121. The second communication interface 102 is coupled to a second communication system 112. The second communication system 112 is coupled to a second display 122. The second communication system 112 uses less bandwidth to transfer video than the first communication system 111.

Some examples of the first communication system 111 include optical fiber systems, wire cable systems, and wireless link systems. One example of the second communication system 112 is the Internet; and in particular, the World-Wide Web (web). One example of the first display 121 is a television. One example of the second display 122 is a portable personal computer with a browser.

The video-on-demand system 100 could comprise a conventional computer platform that is configured with software and conventional communication interfaces. The software directs the computer platform to operate as follows. The processing system 103 transfers a control screen signal to the second communication interface 102. The second communication interface 102 transfers the control screen signal to the second communication system 112. The second communication system 112 transfers the control screen signal to the second display 122. The second display 122 displays the control screen. In some examples of the invention, the control screen is a web page.

In response to viewer input to the control screen, the second display 122 transfers a corresponding viewer control signal to the second communication system 112. The second communication system 112 transfers the viewer control signal to the second communications interface 102. The second communication interface 102 transfers the control signal to the processing system 103.

The processing system 103 transfers video signals to either the first communication interface or the second communication interface in response to the viewer control signal. If the first communication interface 101 is used, then the first communication interface 101 transfers the video signals to the first communication system 111. The first communication system 111 transfers the video signals to the first display 121. The first display 121 displays the video. If the second communication interface 102 is used, then the second communication interface 102 transfers the video signals to the second communication system 112. The second communication system 112 transfers the video signals to the second display 122. The second display 122 displays the video.

The Control Screen—FIGS. 2–5

FIGS. 2–5 depict various versions of the control screen 230 that is generated by the video-on-demand system 100. In particular, the processing system 103 generates and transfers corresponding control screen signals to the second communications interface 102, and the second communications interface 102 transfers the control screen signals over the second communications system 112 to the display 122. The display 122 displays the control screen 230 to the viewer in, response to the control screen signals.

The viewer chooses menu selections using the display 122, and the display 122 transfers corresponding menu selection signals to video-on-demand system 100. In particular, the display 122 transfers the menu selection signals over the second communications system 112 to the second communications interface 102, and the second communications interface 102 transfers the menu selection signals to the processing system 103. The processing system 103 controls the video-on-demand system 100 in response to the menu selection signals.

Figure 2:
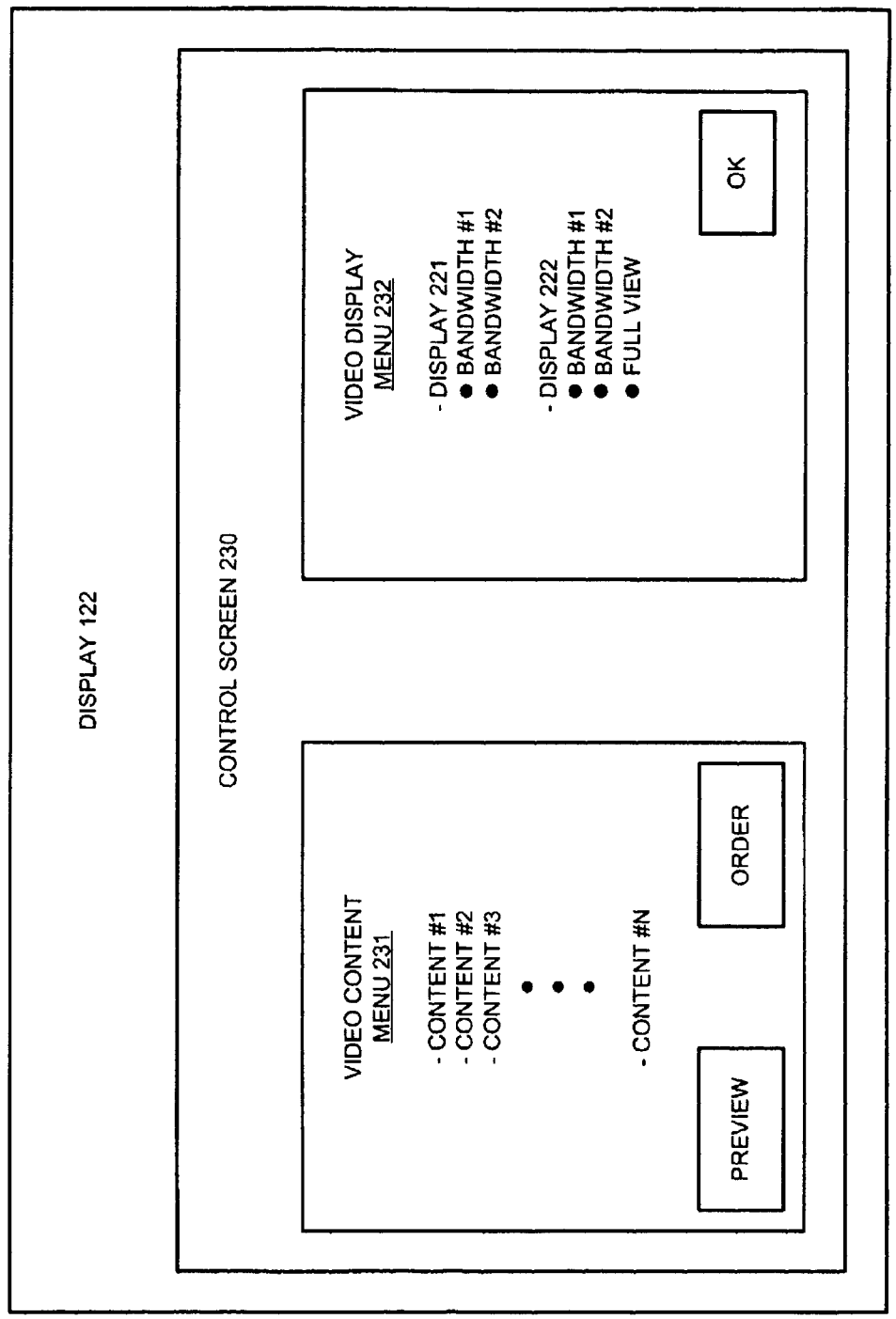
FIG. 2 is a block diagram that illustrates a control screen on a display in an example of the invention.

FIG. 2 is block diagram that illustrates a control screen 230 on the display 122 in an example of the invention. The control screen 230 includes a video content menu 231 and a video display menu 232. The video content menu 231 comprises various menu selections such as movies, documentaries, sports, news, educational material, and games. These menu selection are denoted by content #1, content #2, content #3 . . . content #N on FIG. 2. The video content menu 231 also comprises a preview selection and an order selection. The preview selection allows the viewer to preview the selected video content. The order selection allows the viewer to view the selected video content in its entirety. The video display menu 232 comprises various display characteristics, such as display 221 and display 222, with various bandwidths for each display. The full view selection in the menu 232 causes the display 122 to use more of the control screen to display the video.

When the viewer selects a preview of video content, the display 122 transfers a video preview selection signal to the second communications system 112 indicating the selected video preview. The second communications system 112 transfers the video preview selection signal to the second communications interface 102. The second communications interface 102 transfers the video preview selection signal to the processing system 103.

When the viewer selects video display characteristics, the display 122 transfers a video display menu selection signal to the second communications system 112 indicating the selected video display characteristics. The second communications system 112 transfers the video display menu selection signal to the second communication interface 102. The second communications interface 102 transfers the video display menu selection signal to the processing system 103. The video preview selection signal and the video display menu selection signal could be integrated together.

The processing system 103 processes the video preview selection signal to responsively transfer a preview of the selected video content as video signals. The processing system 103 processes the video display menu selection signal to responsively select either the first communications interface 101 or the second communications interface 102 to transfer the video signals. The selected communication interface then transfers the video signals to the corresponding display over the corresponding communication system. The corresponding display displays the selected video preview in response to the video signals. For example, if the viewer selects a preview of video content #2 on the display 122, then the video-on-demand system 100 transfers the preview of the video content #2 to the display 122 over the communication system 112.

When the viewer selects an order for video content, the display 122 transfers a video content menu selection signal to the second communications system 112 indicating the selected video content. The second communications system 112 transfers the video content menu selection signal to the second communications interface 102. The second communications interface 102 transfers the video content menu selection signal to the processing system 103.

When the viewer selects video display characteristics, the display 122 transfers a video display menu selection signal to the second communications system 112 indicating the selected video display characteristics. The second communications system 112 transfers the video display menu selection signal to the second communication interface 102. The second communications interface 102 transfers the video display menu selection signal to the processing system 103. The video content menu selection signal and the video display menu selection signal could be integrated together.

The processing system 103 processes the video content menu selection signal to responsively transfer the selected video content as video signals. The processing system 103 processes the video display menu selection signal to responsively select either the first communications interface 101 or the second communications interface 102 to transfer the video signals. The selected communication interface then transfers the video signals to the corresponding display over the corresponding communication system. The corresponding display displays the selected video content in response to the video signals. For example, if the viewer selects an order for video content #2 using the display 121, then the video-on-demand system 100 transfers the video content #2 to the display 121 over the communication system 111.

Figure 3:
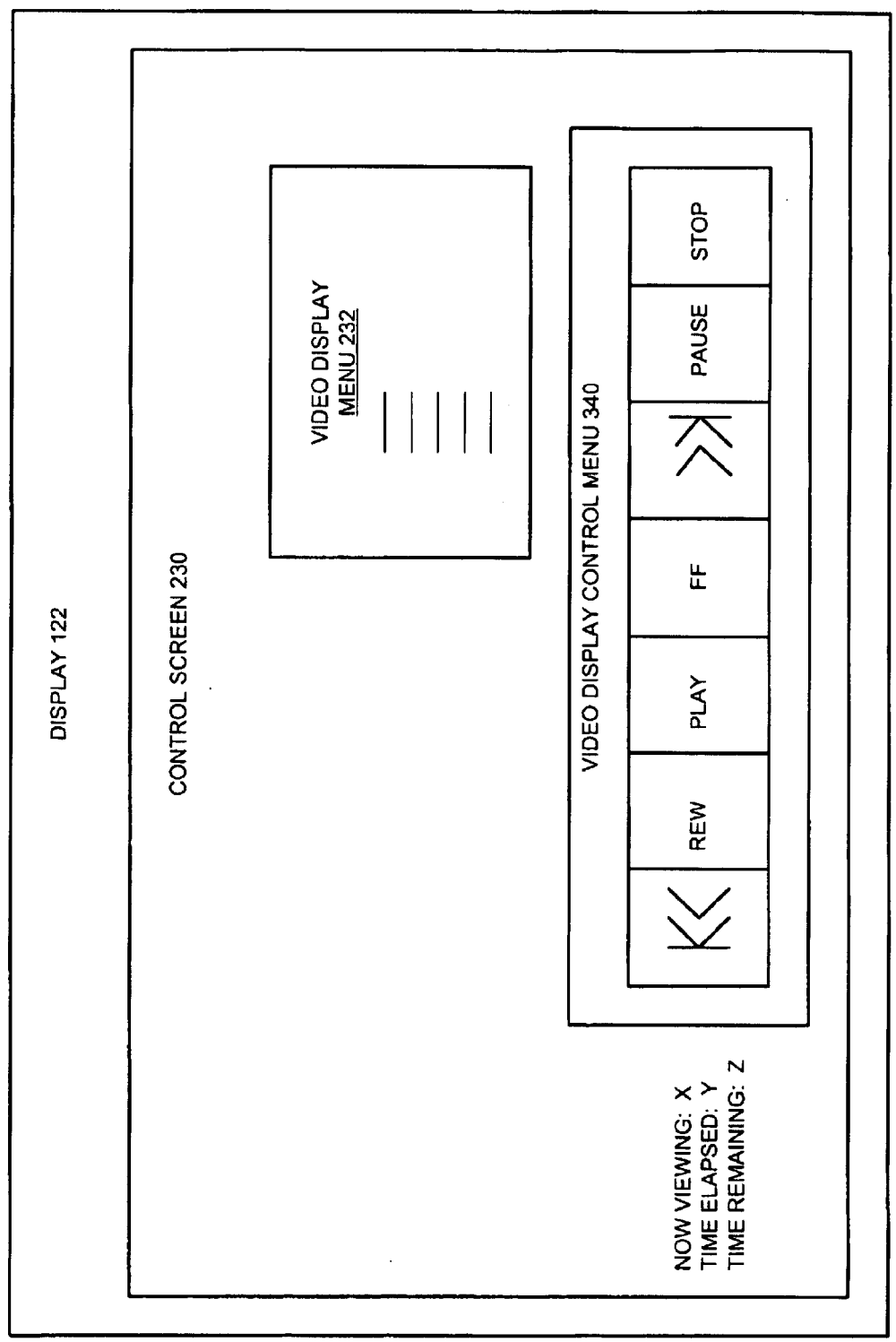
FIG. 3 is a block diagram that illustrates a control screen on a display in an example of the invention.

FIG. 3 is block diagram that illustrates the control screen 230 on the display 122 in an example of the invention. In this example, the display 121 is currently displaying selected video content. The control screen 230 includes the video display menu 232 and a video display control menu 340. The video display control menu 340 comprises selections for go-to-beginning, rewind, play, fast forward, go-to-end, pause, and stop.

When the viewer selects one of these video display controls, the display 122 transfers a video display control menu selection signal to the second communications system 112 indicating the selected video display control. The second communications system 112 transfers the video display control menu selection signal to the second communications interface 102. The second communications interface 102 transfers the video display control menu selection signal to the processing system 103. The processing system 103 processes the video display control menu selection signal, to responsively implement the display control with respect to the video signals. For example, if the viewer selects fast forward using the display 122, then the video-on-demand system 100 fast forwards the video content-being transferred to the display 121 over the communication system 111.

Figure 4:
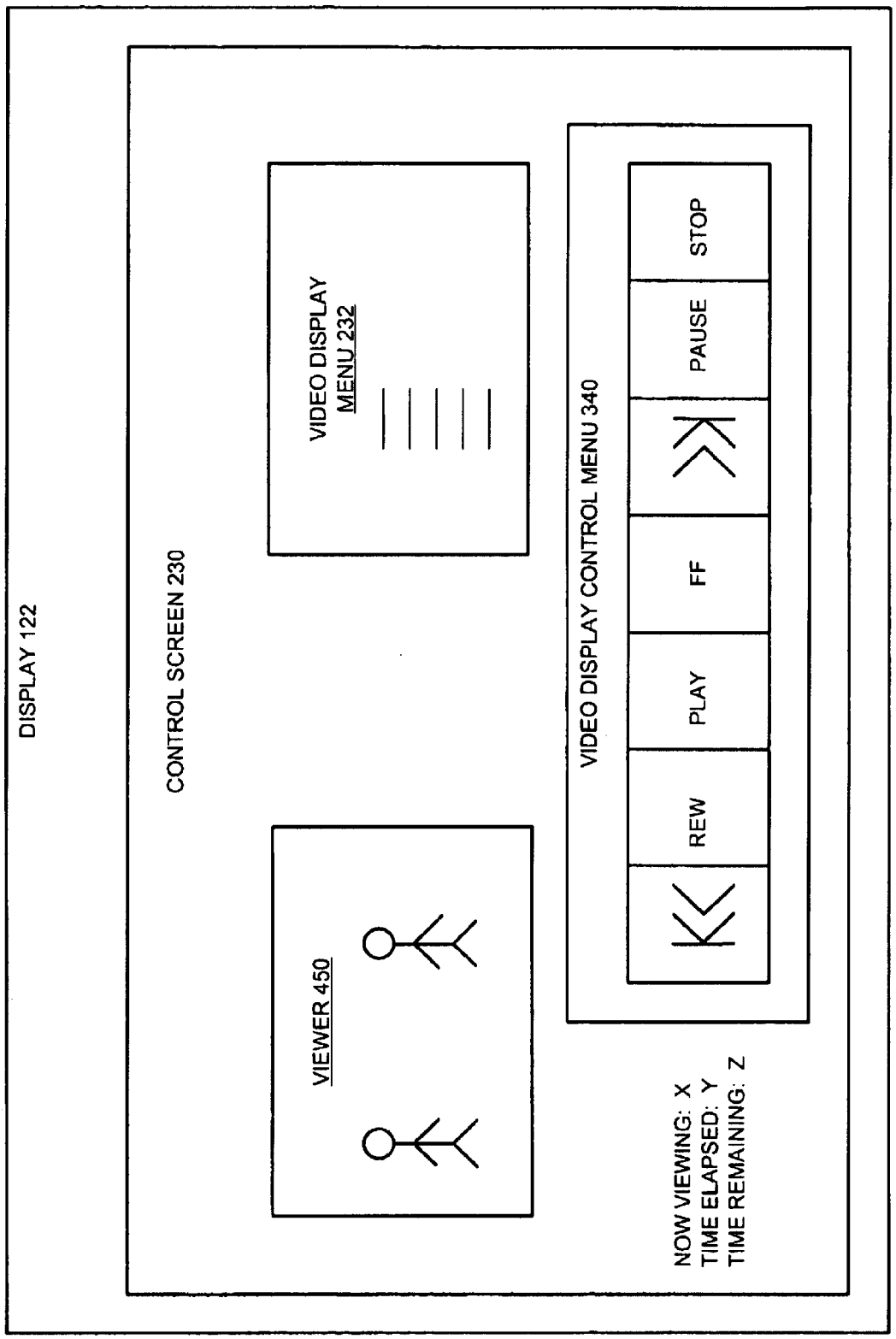
FIG. 4 is a block diagram that illustrates a control screen on a display in an example of the invention.

FIG. 4 is block diagram that illustrates the control screen 230 on the display 122 in an example of the invention. In this example, the display 122 is currently displaying a selected video preview on a viewer 450. The viewer 450 could also be used to display selected video content in addition to previews. The control screen 230 also includes the video display menu 232 and the video display control menu 340.

For example, if the viewer selects fast forward using the display 121, then the video-on-demand system 100 fast forwards the video preview on the viewer 450.

Figure 5:
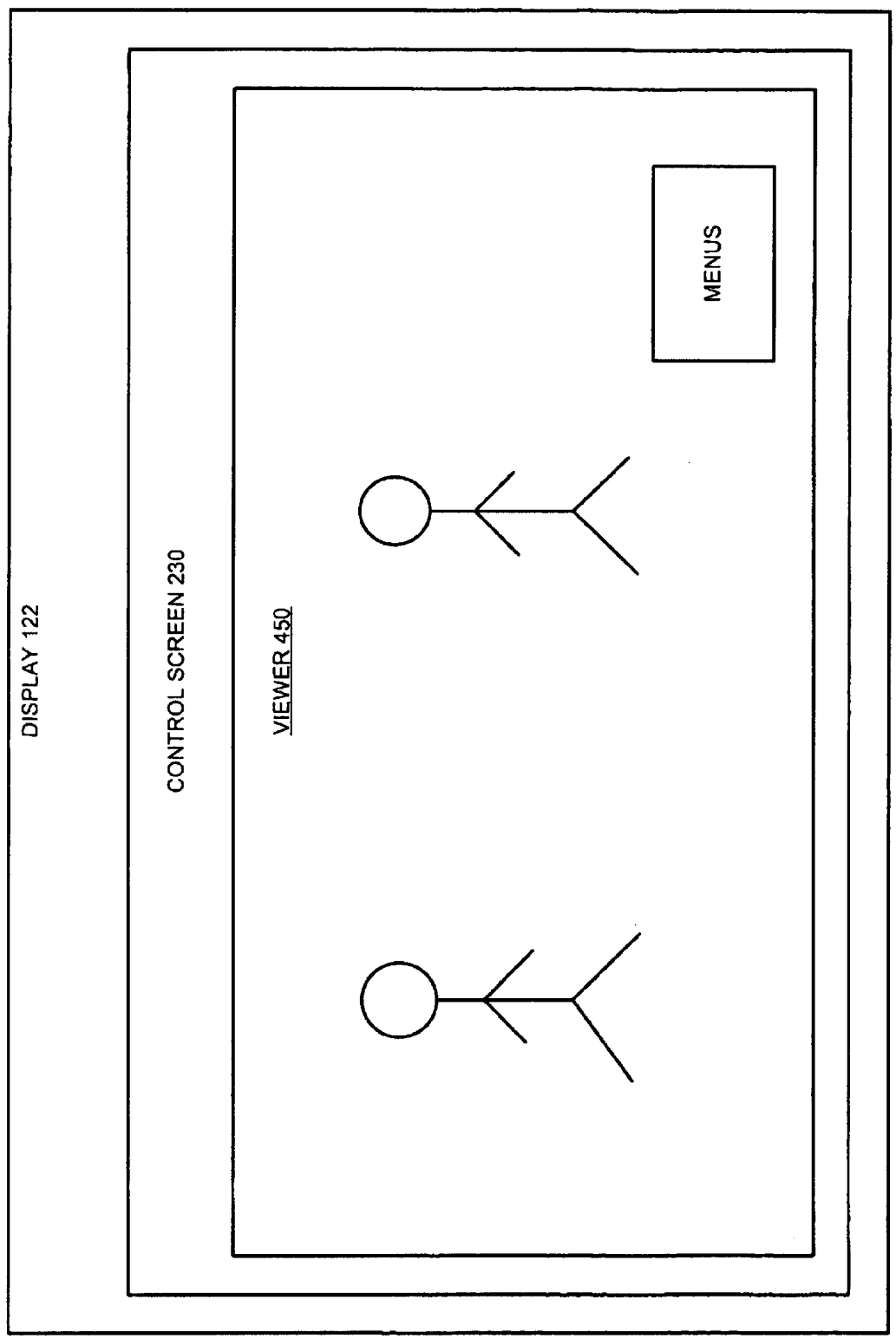
FIG. 5 is a block diagram that illustrates a control screen on a display in an example of the invention.

FIG. 5 is block diagram that illustrates the control screen 230 on the display 122 in an example of the invention. In this example, the display 122 is currently displaying selected video content on the viewer 450, and "full screen" has been selected from video display control menu 340. In response to the full screen menu selection, a larger portion of the control screen 230 is used for the viewer 450 to display the video content. If the viewer selects "menus" on the control screen 230, then the display reverts to the control screen of FIG. 4. The full screen menu selection operates in a similar fashion for video previews.

Figure 6:
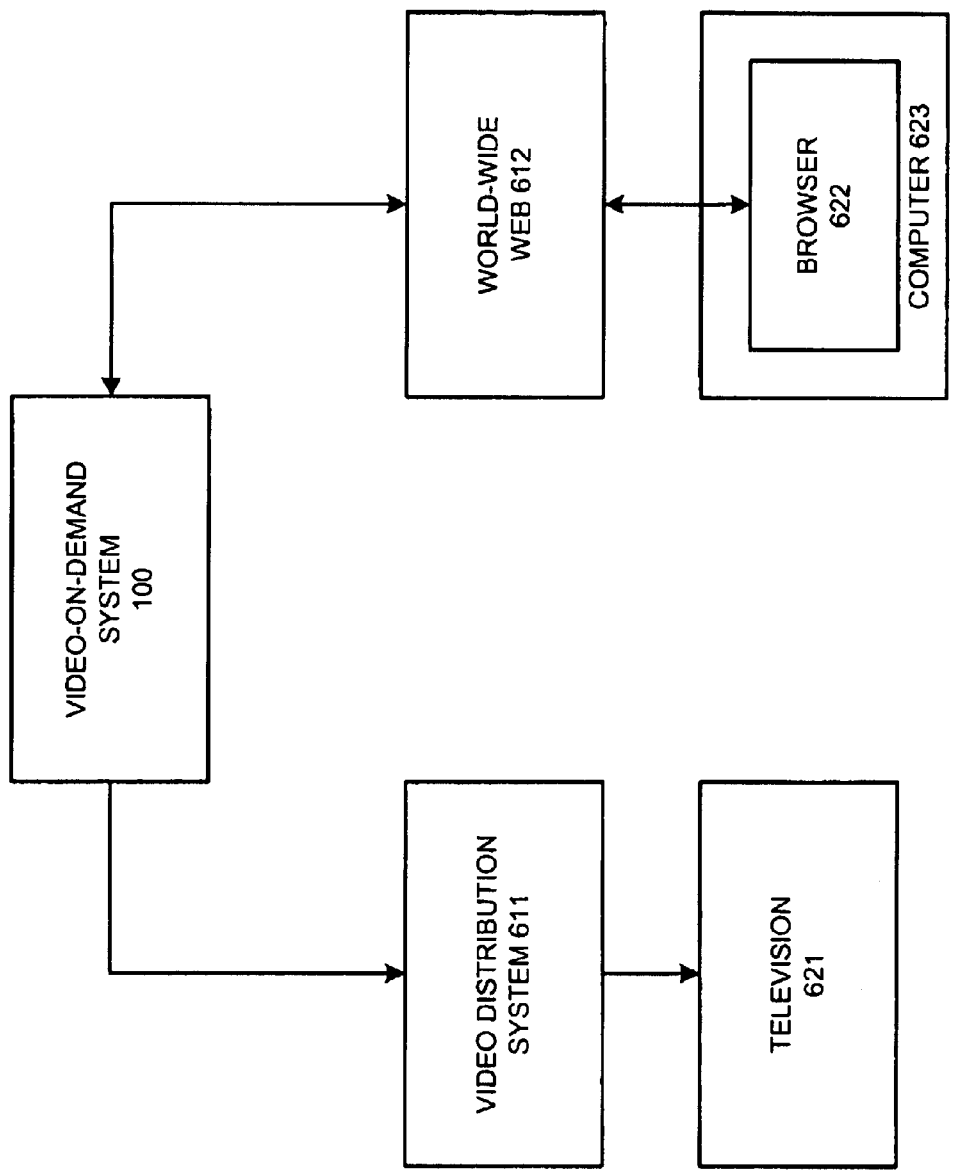
FIG. 6 is a block diagram that illustrates the configuration of a web-based system in an example of the invention.
Figure 7:
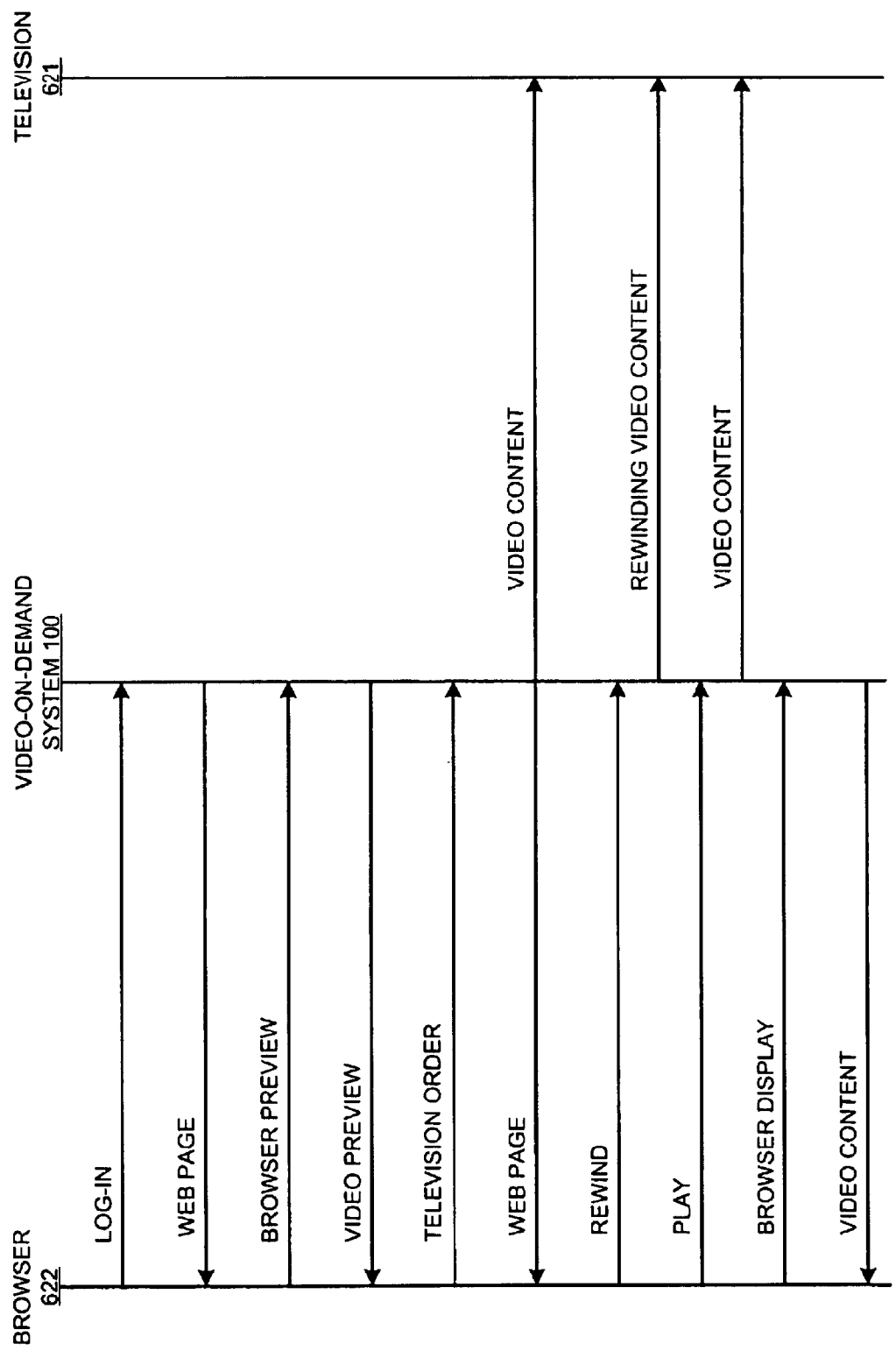
FIG. 7 is a message sequence chart that illustrates the operation of a web-based system in an example of the invention.

Web-Based System Configuration and Operation—
FIGS. 6–7

FIG. 6 is a block diagram that illustrates the configuration of a web-based system in an example of the invention. The video-on-demand system 100 is coupled to a video distribution system 611 and to the web 612. The video distribution system 611 is coupled to a television 621. The web 612 is coupled to a browser 622 running on a portable computer 623. The video-on-demand system 100 communicates with the television 621 over the video distribution system 611 and with the browser 622 over the web 612. The elements 611, 612, 621, and 622/623 respectively correspond to the elements 111, 112, 121, and 122 of FIG. 1

FIG. 7 is a message sequence chart that illustrates the operation of the web-based system in an example of the invention. For clarity, the video distribution system 611 and the web 612 are omitted from FIG. 7. The browser 622 logs-in to the system 100, and in response, the system 100 returns a web page to the browser 622. This web page is similar to FIG. 2.

The browser 622 then transfers menu selections to the system 100 for the browser 622 to display a selected video preview using MPEG I. In response, the system 100 transfers the selected MPEG I video preview to the browser 622 for display. This display is similar to either FIGS. 4 or 5 depending on the full screen selection.

After the video preview, the browser 622 transfers menu selections to the system 100 for the television 621 to display selected video content using MPEG II. In response, the system 100 transfers the selected MPEG II video content to the television 621. The system 100 also transfers a web page to the browser 622. This web page is similar to FIG. 3.

As the television 621 displays the selected video content, the browser 622 transfers a rewind instruction to the system 100. In response, the system 100 transfers rewinding video content to the television 621. The browser 622 then transfers a play instruction to the system 100. In response, the system 100 transfers the rewound video content to the television 621.

As the television 621 displays the selected video content, the browser 622 transfers menu selections to the system 100 for the browser 622 to display the selected video content using MPEG I. In response, the system 100 transfers the selected MPEG I video content to the browser 622 for display. This display is similar to either FIGS. 4 or 5 depending on the full screen selection. It should be appreciated that the video-on-demand system 100 allows the viewer to select the desired display and bandwidth for selected video previews and content. The viewer can switch between different displays, bandwidths, and videos as desired.

There are numerous variations that are included in various examples of the invention. Both displays could be used simultaneously to view the same or different video. The display 122 could omit the viewer 450 and simply provide VCR type control over the display 121. The displays could be remote from one another or be mobile. For example, the display 122 could be a handheld computer with a browser and a wireless communication interface to the web.

The above-described processing system includes instructions that are stored on storage media. The instructions can be read and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits, computers, and logic circuitry. Those skilled in the art are familiar with instructions, processors, and storage media.

Those skilled in the art will appreciate variations of the above-described embodiments that fall within the scope of the invention. As a result, the invention is not limited to the specific examples and illustrations discussed above, but only by the following claims and their equivalents.

We claim:

1. A video-on-demand system comprising:
   a first communication interface configured to transfer video content signals to a first communication system;
   a second communication interface configured to transfer the video content signals to a second communication system, transfer a control screen signal to the second communication system, and receive a video control signal from the second communication system; and
   a processing system configured to transfer the control screen signal to the second communication interface, receive the video control signal from the second communication interface, implement a viewer-control selection indicated by the video control signal, and transfer the video content signals to the first communication interface if the first communication interface is indicated by the video control signal received from the second communication interface or transfer the video content signals to the second communication interface if the second communication interface is indicated by the video control signal.

2. The video-on-demand system of claim 1 wherein the control screen signal includes a video display control menu comprising play and stop.

3. The video-on-demand system of claim 2 wherein the viewer control selection comprises a video display control menu selection.

4. The video-on-demand system of claim 3 wherein the video display control menu further comprises pause, rewind, and fast forward.

5. The video-on-demand system of claim 1 wherein the control screen includes a video content selection menu.

6. The video-on-demand system of claim 5 wherein second communications interface is configured to receive a video content menu selection signal from the second communications system, and the processing system is configured to process the video content selection signal to transfer selected video content in the video content signals.

7. The video-on-demand system of claim 1 wherein the second communication interface is configured to interface with an internet.

8. The video-on-demand system of claim 1 wherein the second communication interface is configured to interface with a world-wide web.

9. The video-on-demand system of claim 1 wherein the control screen comprises a web page.

10. A method of operating a video-on-demand system, the method comprising:

transferring a control screen signal to a second communication system;

receiving a video control signal from the second communication system;

implementing a viewer control selection indicated by the video control signal; and transferring video content signals to a first communication interface if the first communication interface is indicated by the video control signal received from a second communication interface or transferring the video content signals to the second communication interface if the second communication interface is indicated by the video control signal.

11. The method of claim 10 wherein the control screen signal includes a video display control menu comprising play and stop.

12. The method of claim 11 wherein implementing the viewer control selection comprises implementing a video display control menu selection.

13. The method of claim 12 wherein the video display control menu further comprises pause, rewind, and fast forward.

14. The method of claim 10 wherein the control screen includes a video content selection menu.

15. The method of claim 14 further comprising receiving a video content menu selection signal from the second communications system and processing the video content selection signal to transfer selected video content in the video content signals.

16. The method of claim 10 wherein transferring the control screen signal comprises interfacing with an internet.

17. The method of claim 10 wherein transferring the control screen signal comprises interfacing with a world-wide web.

18. The method of claim 10 wherein the control screen comprises a web page.

19. A product comprising a processor-readable storage medium storing processor-executable instructions for performing a method for operating a video-on-demand system, the method comprising:

transferring a control screen signal to a second communication system;

receiving a video control signal from the second communication system;

implementing a viewer control selection indicated by the video control signal; and transferring video content signals to a first communication interface if the first communication interface is indicated by the video control signal received from the second communication interface or transferring the video content signals to the second communication interface if the second communication interface is indicated by the video control signal.

20. The product of claim 19 wherein the control screen signal includes a video display control menu comprising play and stop.

21. The product of claim 20 wherein implementing the viewer control selection comprises implementing a video display control-menu selection.

22. The product of claim 21 wherein the video display control menu further comprises pause, rewind, and fast forward.

23. The product of claim 19 wherein the control screen includes a video content selection menu.

24. The product of claim 23 further comprising receiving a video content menu selection signal from the second communications system and processing the video content selection signal to transfer selected video content in the video content signals.

25. The product of claim 19 wherein the control screen comprises a web page.

* * * * *